US006847648B1

(12) United States Patent
Hodgins et al.

(10) Patent No.: US 6,847,648 B1
(45) Date of Patent: Jan. 25, 2005

(54) METHOD AND APPARATUS FOR SERVING DATA

(75) Inventors: Paul Hodgins, Brussels (BE); Gert Josef Elisa Copejans, Brussels (BE); Yoeri Apts, Brussels (BE); Johan De Vos, Brussels (BE)

(73) Assignee: Sony Europa, B.V., Badhoevedorp (NL)

( * ) Notice: Subject to any disclaimer, the term of this patent is extended or adjusted under 35 U.S.C. 154(b) by 1069 days.

(21) Appl. No.: 09/652,850

(22) Filed: Aug. 31, 2000

Related U.S. Application Data

(62) Division of application No. 08/979,474, filed on Nov. 26, 1997.

(30) Foreign Application Priority Data

| Nov. 27, 1996 | (EP) | 96203334 |
| Nov. 27, 1996 | (EP) | 96203336 |
| Nov. 27, 1996 | (EP) | 96203338 |
| Nov. 27, 1996 | (EP) | 96203339 |
| Nov. 27, 1996 | (EP) | 96203340 |
| Nov. 27, 1996 | (EP) | 96203341 |

(51) Int. Cl.$^7$ ............................................. H04L 12/28
(52) U.S. Cl. .................... 370/395.43; 370/397; 370/410
(58) Field of Search ............................. 370/397, 399, 370/395.32, 395.5, 473, 469, 410, 411, 395.43; 340/825.52

(56) References Cited

U.S. PATENT DOCUMENTS

| 4,493,021 A | * | 1/1985 | Agrawal et al. ............. 709/236 |
| 5,095,480 A | * | 3/1992 | Fenner ........................ 370/238 |
| 5,323,389 A | * | 6/1994 | Bitz et al. .................... 370/397 |
| 5,341,474 A | | 8/1994 | Gelman et al. |
| 5,371,532 A | | 12/1994 | Gelman et al. |
| 5,371,547 A | | 12/1994 | Siracusa et al. |
| 5,414,701 A | * | 5/1995 | Shtayer et al. ............... 370/397 |
| 5,467,349 A | * | 11/1995 | Huey et al. .................. 370/397 |
| 5,481,687 A | | 1/1996 | Goubert et al. |
| 5,966,120 A | * | 10/1999 | Arazi et al. .................. 370/505 |
| 6,034,958 A | * | 3/2000 | Wicklund ..................... 370/397 |
| 6,088,355 A | * | 7/2000 | Mills et al. ................... 370/397 |
| 6,122,279 A | * | 9/2000 | Milway et al. ......... 370/395.32 |
| 6,208,655 B1 | * | 3/2001 | Hodgins et al. ............. 370/397 |

FOREIGN PATENT DOCUMENTS

| EP | 0 574 140 A | 12/1993 |
| EP | 0 596 624 A | 5/1994 |
| EP | 0 601 699 A | 6/1994 |

(List continued on next page.)

OTHER PUBLICATIONS

Computer Networks and ISDN Systems. vol. 26. No. 10 Jul. 1, 1994, pp. 1305–1322, XP000453512, S. Ramanathan et al.: "Towards Personalized Multimedia Dial–Up Services". Computer Society International Conference (COMPCON), Spring Meeting. Los Alamitos. Feb. 26, 1990–Mar. 2, 1990. No. Conf. 35, Feb. 26, 1990, Institute of Electrical and Electronics Engineers, pp. 44–53, XP000146164. J. E. Murray et al.: "Micro–Architecture of the Vax 9000". Computer Technology Review. Dec. 21, 1994. pp. 66, 68, 81–83, XP000429677, Tobagi F. et al.: "Streaming Raid–A Disk Array Management System for Video Files".

(List continued on next page.)

*Primary Examiner*—Duc Ho
*Assistant Examiner*—Phuongchau Ba Nguyen
(74) *Attorney, Agent, or Firm*—Frommer Lawrence & Haug LLP; William S. Frommer

(57) ABSTRACT

VPI/VCI of an ATM cell is translated into an internal ID by distributing VPI/VCI entries into sections in a table according to a portion of each VPI/VCI entry. A section to be searched according to the portion of a VPI/VCI of the received ATM cell is selected; and a search over the selected section is performed to find an entry corresponding to the VPI/VCI of the received ATM cell. An internal ID corresponding to the found entry is outputted.

12 Claims, 13 Drawing Sheets

FOREIGN PATENT DOCUMENTS

| | | |
|---|---|---|
| EP | 0 605 115 A | 7/1994 |
| EP | 0 633 694 A | 1/1995 |
| EP | 0 651 391 A | 5/1995 |
| EP | 0 667 713 A | 8/1995 |
| EP | 0 680 236 A | 11/1995 |
| EP | 0 696 798 A | 2/1996 |
| EP | 0 735 758 A | 10/1996 |
| FR | 2 653 284 A | 4/1991 |
| GB | 2 217 488 A | 10/1989 |
| WO | WO 93 09623 A | 5/1993 |
| WO | WO 96 08896 A | 3/1996 |
| WO | WO 97 04596 A | 2/1997 |

OTHER PUBLICATIONS

IBM Technical Disclosure Bulletin, vol. 39, No. 4, Apr. 1, 1996. pp. 161–163, XP000587459. "Weighted Queueing Algorithm for Efficient Asynchronous Transfer Mode Traffic Shaping".

IEICE Transactions on Electronics. vol. E78–C. No. 12, Dec. 1, 1995, pp. 1738–1745. XP00055581. Yasuharu Tomimitsu et al.: "An ATM Chip Set For High Performance Computer Interfaces. Affording Over 1000 MBPS Sustained Throughput".

Interfaces In Computing, vol. 3, No. 3/4, 12/85. Lausanne Ch. pp. 173–187, XP002005672, R.W. Robinson et al.: "Interfacing to Ethernet Using VLSI protocol chips", p. 179, lines 11–39.

Multimedia Computing and Networking. 1/96. USA, pp. 410–421, XP000675452. M. Kumar et al.: "A High Performance Video Server For Broadband Network Environment". Serving Humanity Through Communications. Supercomm/ICC. New Orleans. May 1, 1994–May 5, 1994, vol. 2. May 1, 1994, Institute of Electrical and Electronics Engineers. Yao–Tzung Wang et al.: "An Improved Scheduling Algorithm for Weighted Round–Robin Cell Multiplexing in an ATM Switch", p. 1034. col. 2, lines 35–44.

* cited by examiner

METHOD AND APPARATUS FOR SERVING DATA

This is a divisional of U.S. patent application Ser. No. 08/979,474, filed Nov. 26, 1997.

The present invention relates to servers for data delivery. Traditionel servers were designed with the tendency to be actively involved in the physical transmission of data. For applications such as video on demand or karoake on demand, deliverance of a high number of digital video streams in real time are required. The digital video stream typically include video data compressed according to ISO/IEC 11172 or ISO/IEC 13818, which are commonly known as MPEG-1 standard and MPEG-2 standard respectively.

An ATM (Asynchronous Transfer Mode)-base server system with capabilities extending beyond mere data delivery has already been proposed in the European Patent Application No. 95.200819.1.

A streaming engine for ATM communication configured as an ASIC (Application Specific Integrated Circuit) has been proposed in the international application WO 96/08896 published under PCT.

A method for recording and reproducing compressed video data according to the MEPG standard is proposed in European Patent Application EP 0 667 713 A2. In this case, the compressed video data is recorded in the disk in the special form including the scan information so that the specific compressed video data reproducing apparatus can achieve VCR functions (e.g. FF, FR).

It is an object of the present invention to improve upon the above mentioned prior art and/or to provide a server for future applications.

The present invention provides in a first aspect a method for translating a VPI/VCI of an ATM cell into an internal ID comprising the steps of:
  distributing VPI/VCI entries into sections in a table according to a portion of each VPI/VCI entry;
  receiving an ATM cell;
  selecting a section to be searched according to the portion of a VPI/VCI of the received ATM cell;
  performing a search over the selected section to find an entry corresponding to the VPI/VCI of the received ATM cell; and
  outputting an internal ID corresponding to the found entry.

Preferred embodiment of the method according to the present invention are described in the dependent subclaims.

Further the present invention provides an apparatus for translating a VPI/VCI of an ATM cell into an internal ID comprising:
  a table for storing VPI/VCI entries and being divided into sections;
  means for distributing VPI/VCI entries into the sections in the table according to a portion of each VPI/VCI entry;
  means for selecting a section to be searched according to the portion of a VPI/VCI of an received ATM cell; and
  means for performing a search over the selected section to find an entry corresponding to the VPI/VCI of the received ATM cell and for outputting an internal ID corresponding to the found entry.

The present invention provides in a second aspect an apparatus for sending data to an ATM network and receiving data from the ATM network comprising:
  (a) a bus interface for interfacing with a bus supporting communication between a host, a storage device and the apparatus;
  (b) an ATM interface for interfacing with the ATM network;
  (c) a transmission unit for transmitting outgoing data from the bus interface to the ATM interface, the transmission unit including
    (1) a first RAM interface for interfacing with RAM being used as a buffer for buffering the outgoing data from the bus interface,
    (2) means for segmenting the outgoing data from the buffer into outgoing ATM cells, and
    (3) a traffic shaper, for controlling traffic of the outgoing ATM cells to the ATM interface in cooperation with the means for segmenting; and
  (d) a reception unit for transmitting incoming data from the ATM interface to the bus interface, the reception unit including
    (1) means for performing VPI/VCI filtering of incoming ATM cells,
    (2) means for reassembling the incoming data using payload of the incoming ATM cells, and
    (3) a second RAM interface for interfacing RAM being used as a buffer for buffering the incoming data the means for reassembling.

This apparatus according to the present invention provides for management of running applications that interact with a large number of clients and management modules distributed over a system, as well as management of the data that are delivered. The server according to the present invention provides time or processing power to run higher level management tasks, as the host is less actively involved in physical transmission of data. The hardware according to the present invention is able to deliver data in real time under different performance requirements and is well suited for such real time delivery. The streaming engine according to the present invention is able to support simultaneous communications with many clients and to facilitate the video streaming task. The server according to the present invention, also provides for interoperability, such as to serve data to any type of client. The content to be delivered, can be stored in a versatile form (i.e. raw or non formatted form) in the server according to the present invention.

The present invention provides in a third aspect a method for streaming data from a storage device comprising the steps of:
  providing write addresses for a burst data to a buffer, at least a portion of the write addresses being non-contiguous;
  transferring the burst data from the storage device to the buffer via a bus supporting communication between a host, the storage device and a streaming device;
  writing the burst data in the buffer according to the write addresses; and
  reading data from the buffer in a linear fashion.

Preferred embodiment of the method according to the present invention are described in the dependent subclaims.

Further the present invention provides a streaming device for streaming a data from a storage device comprising:
  means for receiving a burst data from the storage device via a bus supporting communication between a host, the storage device and the streaming device;
  means for providing write addresses for the burst data, at least a portion of the write addresses being non-contiguous; and
  a buffer for storing the burst data according to the write addresses and outputting data therefrom in a linear fashion.

The present invention provides in a fourth aspect a method for delivering data comprising the steps of:

loading at least a pair of an address and a command from a host;

storing the data in a buffer;

reading the data from the buffer according to a read pointer;

executing the command if a match between the address and an address specified by the read pointer is detected; and delivering the data read from the buffer after the execution of the command.

Further the present invention provides a device for delivering data comprising:

a command block for storing at least a pair of an address and a command loaded from a host and detecting a match between the address and an address specified by a read pointer of a buffer buffering the data;

means for executing the command in cooperation with the command block when the match is detected; and means for delivering the data read from the buffer after the execution of the command.

The present invention provides in a fifth aspect a method for delivering data comprising the steps of:

receiving data from a network;

detecting at least a preset bit pattern in the data when the received data is transmitted to a storage device;

adding location information corresponding to a location of the preset bit pattern in the data to a list when the preset bit pattern is detected;

storing the data in the storage device; and controlling a delivery of the data from the storage device to the network according to the location information in the list.

Preferred embodiment of this method are described in the dependent subclaims.

Further the present invention provides an apparatus for delivering data comprising:

receiving means for receiving data from a network;

a pattern detector for detecting at least a preset bit pattern in the data when the data is transmitted from the receiving means to a storage device storing the data;

a list for storing location information corresponding to a location of the preset bit pattern in the data when the preset bit pattern is detected by the pattern detector; and means for controlling a delivery of the data from the storage device to the network according to the location information in the list.

The present invention provides in a sixth aspect a traffic shaping method comprising the steps of:

classifying one or more first streams into one or more classes, each class including one or more streams having the same bit rate characteristics;

setting a set of parameters to control the bit rate for each class; and executing a rate pacing of each class according to the set of parameters.

Preferred embodiment of this method are described in the dependent subclaims.

Further the present invention provides a traffic shaper comprising:

means for classifying one or more first streams into one or more classes, each class including one or more streams having the same bit rate characteristics;

storage means for storing a set of parameters to control the bit rate for each class; and means for executing a rate pacing of each class according to the set of parameters in the storage means.

Further advantages, features and details of the present invention will become clear when reading the following description, in which reference is made to the annexed drawings, in which.

Figure 1:
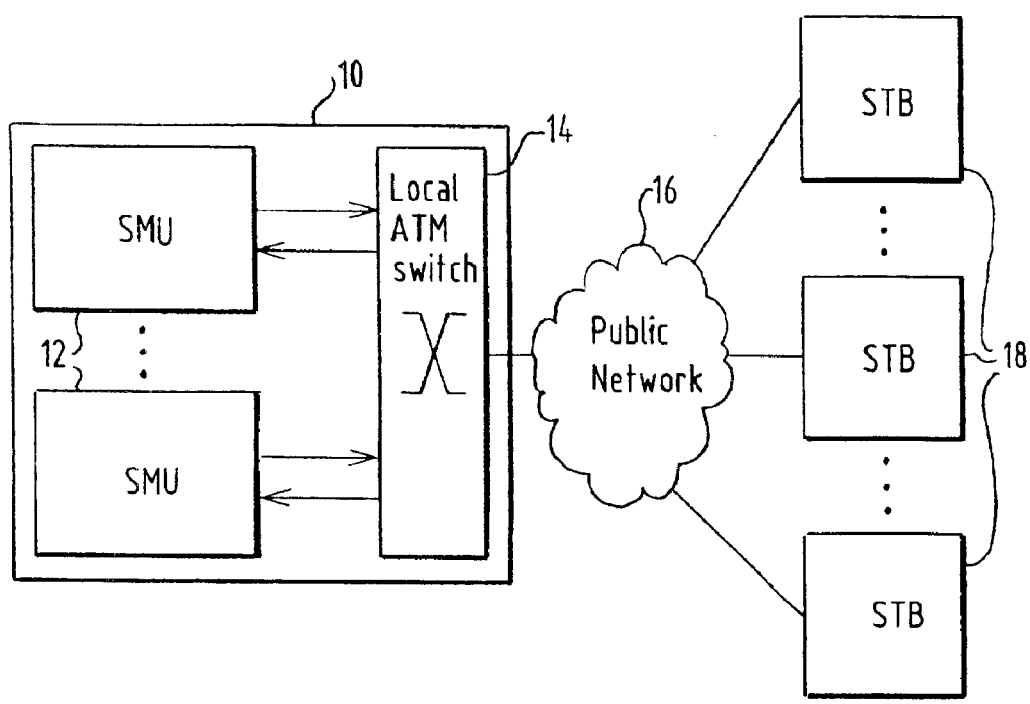
FIG. 1 shows a general system architecture of an interactive communication system.

FIG. 1 shows a general system architecture of a preferred embodiment of an interactive communication system. This is a broad-band system that supports virtually any kind of interactive multi-media application. Particular attention is paid to real time multimedia delivery mode applications.

A server 10 functions as VOD (Video On Demand) server, KOD (Karaoke On Demand) server, and/or Internet server, etc. and communicates with STBs (Set Top Box) 18 as clients over a public network 16. The server 10 consists of a local ATM switch 14 and several SMUs (Storage Medium Unit) 12 that are interconnected thorough the local ATM switch 14. The main purposes of the local ATM switch 14 are to route data between the SMUs 12 (for instance, to duplicate a movie compressed according to the MPEG standard from one SMU to another), create a ATM-based LAN inside the server 10, and interface to the public network 16. Each SMU 12 communicates with the local ATM switch 14 at high speed, with current technology at e.g. a maximum of 622 Mbps. The public network 16 is optional and the server 10 may directly communicates with the STBs 18.

Figure 2:
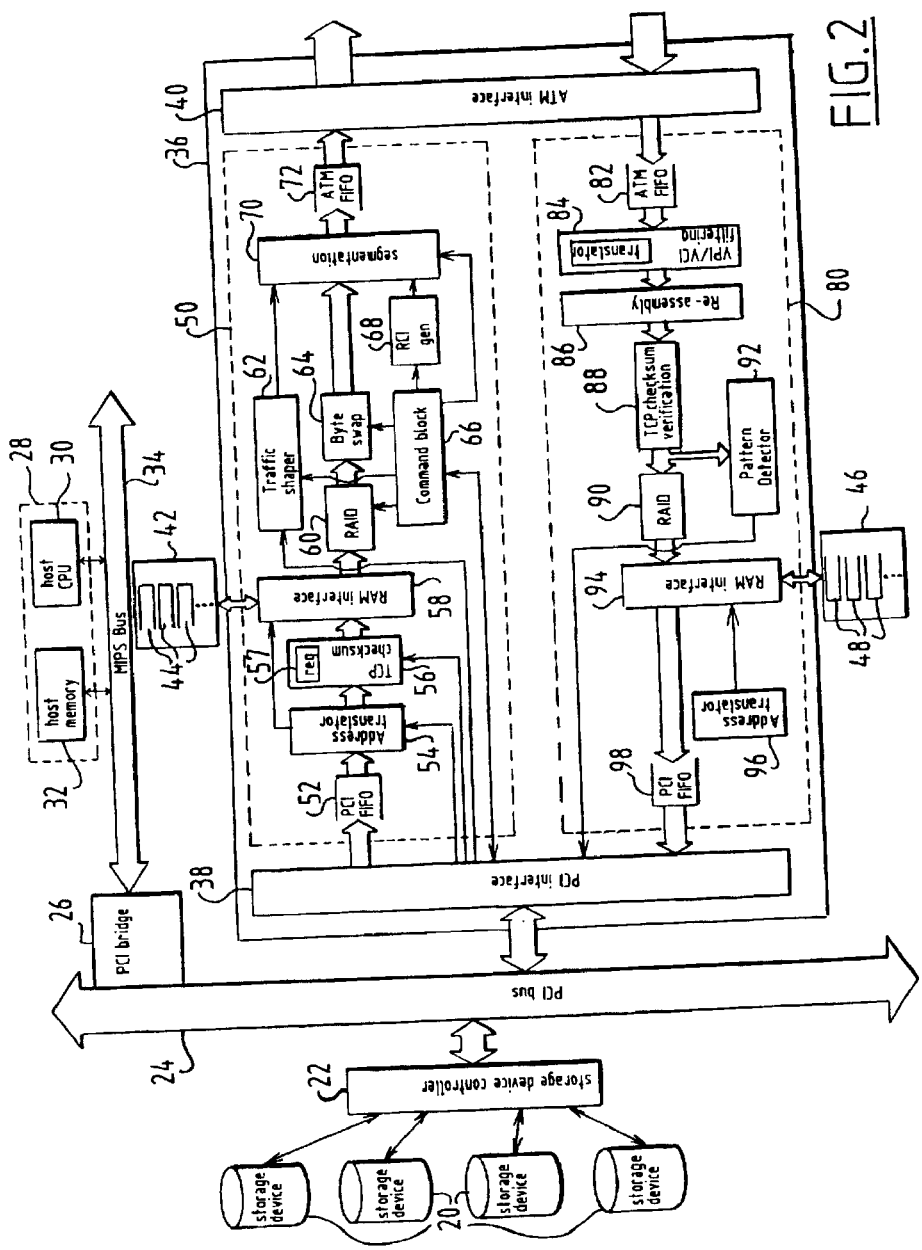
FIG. 2 shows a detail block diagram of an embodiment of the apparatus according to the present invention.

FIG. 2 shows a detail block diagram of the SMU 12. The SMU 12 has storage devices 20, a host 28 and a streaming engine 36 as major units. These units are interconnected via a PCI (Peripheral Component Interconnect) bus 24. A host CPU 30 and a host memory 32 in the host 28 are connected via MIPS bus 34 in a conventional configuration. In this embodiment the MIPS bus 34 is connected to the PCI bus 24 thorough a PCI bridge 26. The host 28 is primarily intended for running applications like VOD, KOD, internet server that interact with clients or STBs.

The storage devices 20 contains one or more strings of hard disks. These hard disks are connected via SCSI or Fibre Channel and store real time sensitive data like MPEG-2 encoded video streams and the contents of data packets like the body of TCP/IP (Transmission Control Protocol/Internet Protocol) packets without the headers.

The streaming engine 36 is preferably configured as a single ASIC (Application Specific Integrated Circuit). The streaming engine 36 streams the real time sensitive data and the data packets. The streaming engine 36 has a transmission path 50 and a reception path 80 as major parts and a PCI interface 38 and an interface 40. The transmission path 50 handles the outgoing data stream from the storage devices 20 and the host 28 to the local ATM switch 14. The reception path 80 handles the incoming data stream from the local ATM switch 14 to the storage devices 20 and the host 28. The high speed connections and the independence of the transmission path and reception path allow for 622 Mbps simultaneously in both directions.

The PCI interface 38 interfaces the PCI bus 24 with the transmission path 50 and the reception path 80. The PCI interface 38 transfers the outgoing data stream from the PCI bus 24 to a PCI FIFO 52 in the transmission path 50 and transfers the incoming data stream from a PCI FIFO 98 in the reception path to the PCI bus 24.

The interface 40 interfaces the transmission path 50 and the reception path 80 with an external physical layer device (not shown) connected to the local ATM switch 14. The interface 40 can include two types of ATM interfaces according to the UTOPIA (Universal Test and Operation PHY Interface for ATM) level 2 standard. One is UTOPIA interface in 8 bit wide data path mode and the other is UTOPIA interface in 16 bit wide data path mode.

The transmission path 50 consist of several functional blocks which act together to perform high speed transmission.

The first block in the transmission path 50 is the Tx address translator 54, which places the outgoing data stream from the PCI FIFO 52 into host-specified memory locations of a stream buffer 44 allocated in an external RAM 42. This allows for controlled "scattering" of data into non-contiguous memory, which is useful for an operation which to some extent resembles so-called RAID (Redundant Array of Inexpensive Disks) operation which ensures integrity of data streams and TCP/IP packetisation.

The TCP/IP checksum block 56 provides hardware support for calculating TCP/IP checksums. Its function is to calculate and maintain a partial checksum for each packet until all data has been transferred. The TCP/IP checksum block 56 works together with the Tx address translator 54 to create TCP/IP packets directly in the stream buffer 44. The TCP/IP header and payload of the packets are placed in the stream buffer 44 separately, passing through the checksum block 56 which keeps a partial checksum. As soon as all data is in the stream buffer 44, the checksum value is placed in the correct position of TCP/IP header, the packet is ready for transmission.

The RAM interface 58 forms an interface between the external RAM 42 and the transmission path 50. The external RAM 42 may comprise dual ported SDRAM (Synchronous Dynamic RAM). This external RAM 42 includes several stream buffers 44 to decouple the bursty data traffic from the disks of the storage devices 20 and provides the required constant bit rate data streams to the ATM-network 16. Each stream buffer handles one outgoing data stream. In the contrast to the incoming direction, since the data flow characteristics in the outgoing direction are fully predictable (controllable), the buffer requirements can be estimated beforehand. Therefore the stream buffers 44 are statically allocated in the external RAM 42.

The Tx RAID or SDI (Stream Data Integrity) block 60 provides support for data redundancy. The Tx address translator 54 places the data as needed in stream buffer 44. Then, as data is output from the stream buffer 44, the Tx RAID block 60 corrects error data in the event that one of the disks in the storage devices 20 breaks down.

The traffic shaper 62 controls the streaming of the outgoing data from the stream buffers 44 to the ATM network 16. It is designed for very accurate rate pacing and low CDV (Cell Delay Variation). The traffic shaper 62 consists of two main sections. One section handles high priority data such as video traffic, and the other section handles general data traffic of low priority.

The command block 66 is intended to off-load the host especially 28 of real-time sensitive jobs. It performs actions triggered by the transmission of the content of exact known locations in the outgoing data stream.

The segmentation block 70 segments the outgoing data stream provided from the stream buffer 44 into AAL-5 PDUs (ATM Adaptation Layer-5 Protocol Data Units), and maps the AAL-5 PDUs into ATM cells. In case the outgoing data stream is MPEG-2 SPTS (Single Program Transport Stream), the segmentation block 70 is able to segment two TS packets in the MPEG-2 SPTS to one AAL-5 PDU, unless there are less than two TS packets left in the MPEG-2 SPTS, in the latter case the AAL-5 PDU maps into eight ATM cells. In the general case, the AAL-5 segmentation is controlled by the PDU size which is programmable per stream.

The reception path 80 has several blocks corresponding to the reverse operation of the blocks of transmission path 50.

A VPI/VCI (Virtual Path Identifier/Virtual Channel Identifier) filtering block 84 performs fast and efficient VPI/VCI filtering of the incoming ATM cells. This is done by a combined hash and linear search functions over the entries in a VPI/VCI table.

A reassembly block 86 basically performs the inverse functions of the segmentation block 70. The reassembly block 86 reconstructs the AAL-5 PDUs using payload of the ATM cells, then maps the AAL-5 PDUs into the upper layer data (e.g., MPEG-2 SPTS, TCP/IP Packets).

A TCP checksum verification block 88 verifies the TCP checksum in the TCP header if the incoming data stream is transmitted via TCP.

A pattern detector 92 allows a limited number of bit patterns to be detected in an incoming data stream. A list is created, indicating exactly where the specified bit patterns occur in the stream. This supports certain processing tasks that can be performed on-the-fly, whereas they would otherwise have to be done with post-processing.

A Rx RAID or SDI block 90 adds redundancy to the incoming data stream. If a sequence of N words is written to a buffer (not shown), the parity over these N words is written next. This function can be turned on/off. If the incoming data stream will be stored in the storage device 20 and transmitted later as TCP/IP packets via the transmission path 50, the function is turned off.

A RAM interface 94 is an interface between the reception path 80 and an external RAM 46. The external RAM 46 may comprise dual ported SDRAM. The external RAM 46 is used as several stream buffers 48 storing incoming data streams. Each stream buffer 48 handles one incoming data stream. Incoming data streams can have unpredictable properties. For instance, some of data packets can be very bursty. This means the required buffer capacity varies from stream to stream and from time to time. Therefore, In the external RAM 46, a dynamic buffer allocation is preferred.

A Rx address translator 96 provides appropriate read addresses to the stream buffer 48.

The details of the major blocks in the streaming engine 36 are described below.

Tx Address Translator

The outgoing data stream is provided from the storage device 20 to the streaming engine 36 in burst transmission over the PCI bus 24. The purpose of the Tx address translator 54 is to scatter one contiguous DMA burst in appropriate areas of the stream buffer 44.

Figure 3:
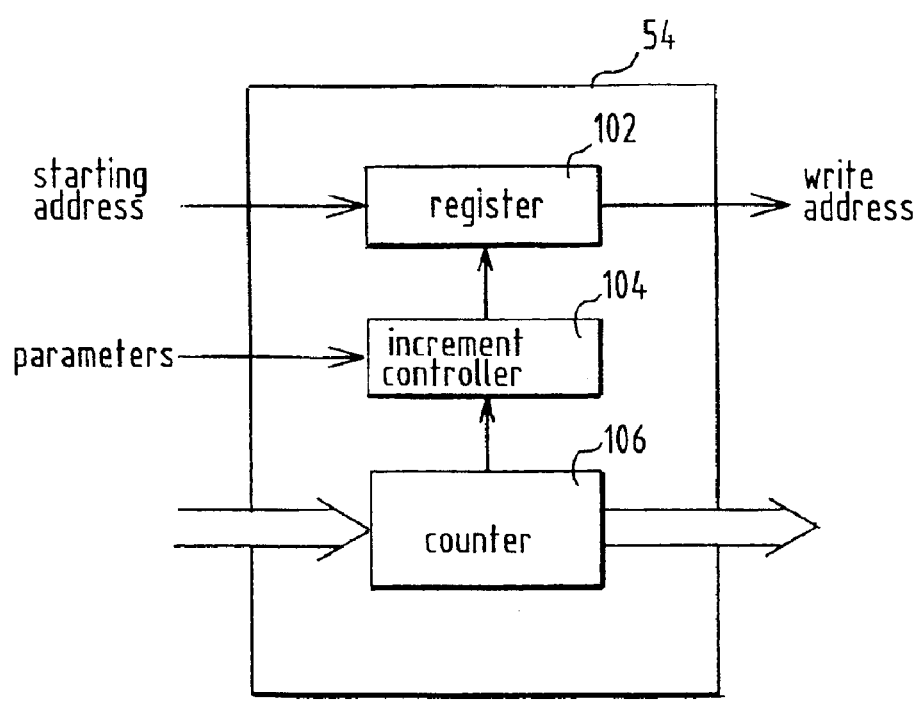
FIG. 3 shows a block diagram of the Tx address translator of FIG. 2.

FIG. 3 shows a block diagram of the Tx address translator 54. Before one contiguous DMA burst from the storage device 20 arrives, the correct starting address is written to a register 102 via a storage device controller 22. The content of the register 102 is used as write address for the stream buffer 44. A counter 106 counts the number of bits of the outgoing data stream from the PCI FIFO 52. Each time a data word consisting of 32 bits passes the counter 106, it inform a increment controller 104 that a word is transferred to the stream buffer 44. With each new word, the increment controller 104 increments the content of the register 102 with ADDRESS_INCREMENT, which is a programmable value. In case of the outgoing data stream being RAID processed data, the value of ADDRESS_INCREMENT is basically set according to the number of disks used for RAID system. In case of the outgoing data stream being payload of a TCP/IP packet, the value of ADDRESS_INCREMENT is basically set according to packetisation parameters.

An address translation when the outgoing data stream is RAID processed data, is described below with reference to FIG. 4. In this example, the RAID or SDI system consists of four disks Disk 0, Disk 1, Disk 2 and Disk 3. The Disk 0 contains words 1, 4, 7 . . . to be transmitted to the local ATM switch 14. The Disk 1 also contains words 2, 5, 8 . . . to be transmitted to the local ATM switch 14. The Disk 2 also contains words 3, 6, 9 . . . to be transmitted to the local ATM switch 14. The Disk 3 contains parity words 0, 1, 2 . . . for error correction. Each parity word (e.g., parity 0) has been generated in the Rx RAID block 90 from three words (e.g., words 1, 2 and 3) which constitute so-called stripe unit of RAID together with the parity word.

In the event of failure in one of the disks (e.g., Disk 2), one contiguous DMA burst including parity words is transferred to the Tx address translator 54. For ease of explanation, assume that the size of one contiguous DMA burst is 96 bytes (24 words), although the actual size can be larger than 100 k bytes (depending on the speed of the hard- and/or software). In this case, the contiguous DMA burst 120 consists of words 1, 4, 7, 10, 13, 16 from the Disk 0, words 2, 5, 8, 11, 14, 17 from the Disk 1, words 3, 6, 9, 12, 15, 18 from the Disk 2, and parity words 0, 1, 2, 3, 4, 5 from the Disk 3. The Tx address translator 54 generates the following sequence of addresses:

178, 182, 186, 190, 194, 198 (data from Disk 0)
179, 183, 187, 191, 195, 199 (data from Disk 1)
180, 184, 188, 192, 196, 200 (data from Disk 2)
181, 185, 189, 193, 197, 204 (data from Disk 3)

More specifically, before the contiguous DMA burst 120 arrives at the stream buffer 44, a value 178 is snored in the register 102 as the starting address. Then the word 1 form Disk 0 is written in the address 178 in the stream buffer 44. When the word 1 passes the counter 106, the increment controller 104 increments the value 178 in the register 102 with ADDRESS_INCREMENT of a value 4 corresponding to the number of disks. Then the word 4 from the Disk 0 is written in the address 182 in the stream buffer 44. When the word 4 passes the counter 106, the increment controller 104 increments the value 182 in the register 102 with ADDRESS_INCREMENT of a value 4. Then the word 7 from the Disk 0 is written in the address 186 in the stream buffer 44. Similarly, remaining words 10, 13 and 16 from Disk 0 are written in the addresses 190, 194, 198 which are the number of disks apart in the stream buffer 44.

When the word 16 from Disk 0 passes the counter 106, the increment controller 104 increments the value 198 in the register 102 with ADDRESS_INCREMENT of a value −19. Then the word 2 from Disk 1 is written in the address 179 in the stream buffer 44. When the word 2 passes the counter 106, the increment controller 104 increments the value 179 in the register 102 with ADDRESS_INCREMENT of a value 4. Then the word 5 from Disk 1 is written in the address 183 in the stream buffer 44. When the word 5 passes the counter 106, the increment controller 104 increments the value 183 in the register 102 with ADDRESS_INCREMENT of a value 4. Then the word 8 from Disk 1 is written in the address 187 in the stream buffer 44. Similarly, remaining words from Disk 1 are written in the addresses 191, 195, 199 which are the number of disks apart in stream buffer 44.

In the same way, words from the Disks 2 and 3 are written in appropriate addresses in the stream buffer 44. The words written in the stream buffer 44 are read in liner fashion and provided to the Tx RAID block 60 to correct errors.

When the outgoing data stream from the storage device 20 is TCP/IP payload, the address translator 54 and the TCP checksum calculation block 56 work closely together to provide support for TCP/IP packet generation. The host 28 pre-programs the Tx address translator 54 so that data is distributed according to a specified packet size. At first the host 28 needs to know all the packetisation parameters. Important parameters for this operation are TCP payload size, TCP header size, IP header size and IP payload size. TCP header and IP header basically have space for optional data but this is in practice not used. Therefore, a simplification can be introduced by assuming default sizes for the headers: TCP header size is 5 words (20 bytes) and IP header size is 5 words (20 bytes).

The mechanism can be described as follows.

The host 28 itself does a partial checksum calculation over the pseudo-header of the TCP/IP header. Then it initializes a TCP checksum register 57 in the TCP checksum block 56 for that TCP/IP packet with this value. Space for the stream buffer 44 also will be reserved in the external RAM 42 to fit the full TCP packet plus the TCP and IP header overhead.

The host 28 will then instruct the increment controller 104 in the Tx address translator 54 with the TCP payload size, TCP header size, IP header size and IP payload size. The TCP payload can then be sent as one contiguous DMA burst over the PCI bus 24 and placed into the area in the stream buffer 44 reserved for it by the Tx address translator 54, leaving space for the headers. As it goes from the PCI bus 24 to the stream buffer 44, the checksum calculation block 56 updates the partial checksum in the TCP checksum register 57. Note that with this method the payload, representing usually the bulk of the TCP/IP packets, does not need to be copied first from the storage devices 20 to the host memory 32 for processing it and then to the stream buffer 44. This saves valuable bus bandwidth and overhead for the host CPU 30. After the payload has been written, the header information, prepared by the host 28, is sent to the stream buffer 44 via the address translator 54. As with the payload, the Tx address translator 54 places the header in the previously reserved memory locations.

This sequence can be reversed, whereby the header information is written first and the payload second.

In either case, when both the header and the payload have been written, the TCP checksum will be complete and can be copied to the correct location automatically.

This mechanism can also be used to efficiently support segmenting of a TCP packet into multiple smaller IP packets. In this case, space is reserved for each IP packet. The TCP packet data (header+payload) is segmented into these packets and the header of each IP packet is written by the host 28.

All IP packets will be the same size except for the last block, which is likely to have a different size than the others. The address translator 54 takes this in to account. After the complete TCP/IP packet(s) has been formed, it is ready for transmission.

Figure 5:
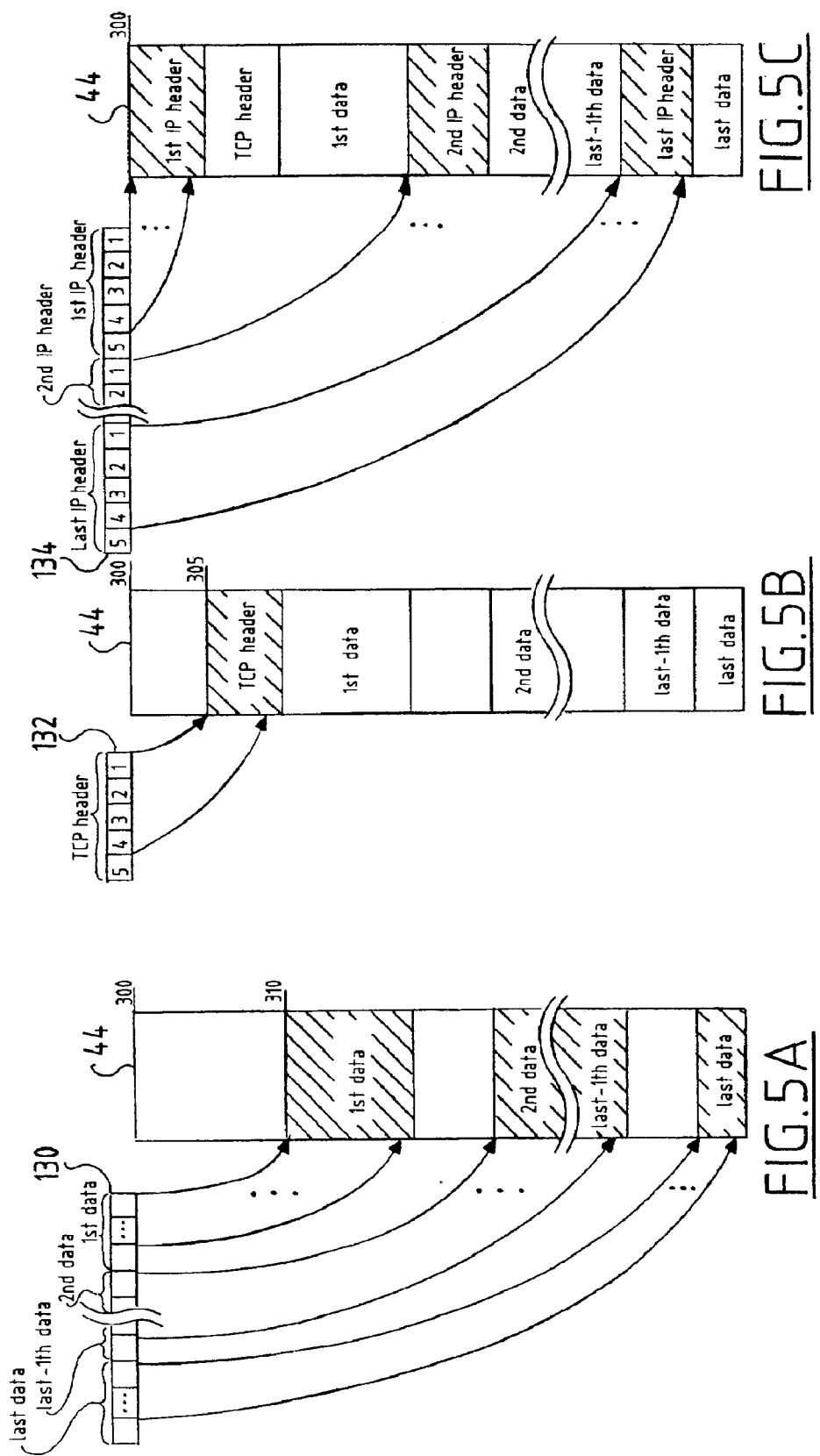
FIGS. 5A, 5B, 5C show respective examples of address translation for TCP IP packetisation.

FIGS. 5A, 5B and 5C shows an example of address translation for TCP/IP packetisation. In this case, before the TCP/IP payload sent as one contiguous DMA burst 130 arrives at the stream buffer 44, a value 310 is stored in the register 102 as the starting write address, then the first word of the first data is written in the address 310 in the stream buffer 44. When the first word of the first data passes the counter 106, the increment controller 104 increments the value 310 in the register 102 with ADDRESS_INCREMENT of value 1. Then the second word of the first data is written in the address 311 in the stream buffer 44. When the second word of the first data passes the counter 106, the increment controller 104 increments the value 311 in the register 102 with ADDRESS_INCREMENT of value 1. Then the third word of the first data is written in the address 312 in the stream buffer 44. The increment with ADDRESS_INCREMENT of value 1 is repeated a number of times corresponding to the IP payload size. Thus the first data of the TCP/IP payload is written in an appropriate area.

Then the increment controller 104 increments the content in the register 102 with ADDRESS_INCREMENT of a value corresponding to IP header size. Then the writing of second data starts from the address according to the content of the register 102. Thus the address translator 54 generates write addresses for the payload so that the space for the headers are left. The last data is likely to have a different size than the others. The size of the last data is calculated in the increment controller 104 by the following expression:

The last data size=TCP payload size mod IP payload size

Therefore the number of increment is controlled taking the last data size into account. In this way, the payload sent as one contiguous DMA burst is scattered in the shaded areas in the stream buffer 44 shown as FIG. 5A.

Next, When the TCP header 132 is sent as one contiguous burst over the PCI bus 24, the address translator 54 generates write addresses corresponding to the previously reserved memory locations for the TCP header in the stream buffer 44.

More specifically, before the TCP header sent as one contiguous burst 132 arrives at the stream buffer 44, a value 305 is set in the register 102 as the starting write address, whereafter the first word of the TCP header is written in the address 305 in the stream buffer 44. When the first word of the TCP header passes the counter 106, the increment controller 104 increments the value 305 in the register 102 with ADDRESS_INCREMENT of value 1. Then the second word of the TCP header is written in the address 306 in the stream buffer 44. When the second word of the TCP header passes the counter 106, the increment controller 104 increments the value 306 in the register 102 with ADDRESS_INCREMENT of value 1. Then the third word of the TCP header is written in the address 307 in the stream buffer 44. The increment with ADDRESS_INCREMENT of value 1 is repeated a number of times corresponding to the TCP header size. Thus the TCP header is written in the shaded area in the stream buffer 44 shown as FIG. 5B.

Next, When the IP headers 134 are sent as one contiguous burst over the PCI bus 24, the address translator 54 generates write addresses corresponding to the previously reserved memory locations for the IP headers in the stream buffer 44.

More specifically, before the IP headers sent as one contiguous burst 134 arrives at the stream buffer 44, a value 300 is set in the register 102 as the starting write address, whereafter the first word of the first IP header is written in the address 300 in the stream buffer 44. When the first word of the first IP header passes the counter 106, the increment controller 104 increments the value 300 in the register 102 with ADDRESS_INCREMENT of value 1. Then the second word of the first IP header is written in the address 301 in the stream buffer 44. When the second word of the first IP header passes the counter 106, the increment controller 104 increments the value 301 in the register 102 with ADDRESS_INCREMENT of value 1. Then the third word of the first IP header is written in the address 302 in the stream buffer 44. The increment with ADDRESS_INCREMENT of value 1 is repeated a number of times corresponding to the IP header size.

Then the increment controller 104 increments the content in the register 102 with ADDRESS_INCREMENT of a value corresponding to TCP header size+IP payload size. Then the writing of second IP header starts from the address according to the content of the register 102. Thus the IP headers are written in the shaded areas in the stream buffer 44 shown as FIG. 5C.

Next, the TCP checksum completed by the TCP checksum block 56 is copied to the correct location.

In this way, the TCP/IP packetisation is completed and can be read from the stream buffer 44 in linear fashion.

In the above embodiment, TCP/IP packetisation is mentioned. However it is possible to use UDP (User Datagram Protocol) instead of TCP. In this case, the default size of UDP header is 2 words (8 bytes).

In addition, in the above embodiment, the TCP header and the IP headers are sent as different bursts from the host 28 to the Tx address translator 54. However it is possible to send the TCP header and the IP headers together as one contiguous burst from the host 28 to the Tx address translator 54.

Tx RAID or SDI block

In the sequence of words in the stream buffer 44, parity words may be inserted. This redundancy provides a means for correcting errors. The Tx RAID or SDI block 60 takes in a sequence of N+1 words of which the last word is the parity over the N first words. In case it is indicated by hardware and/or software, that word M is corrupt, e.g., because of a disk failure, the parity word is retrieved from the storage device 20 and used to reconstruct the word M.

Figure 4:
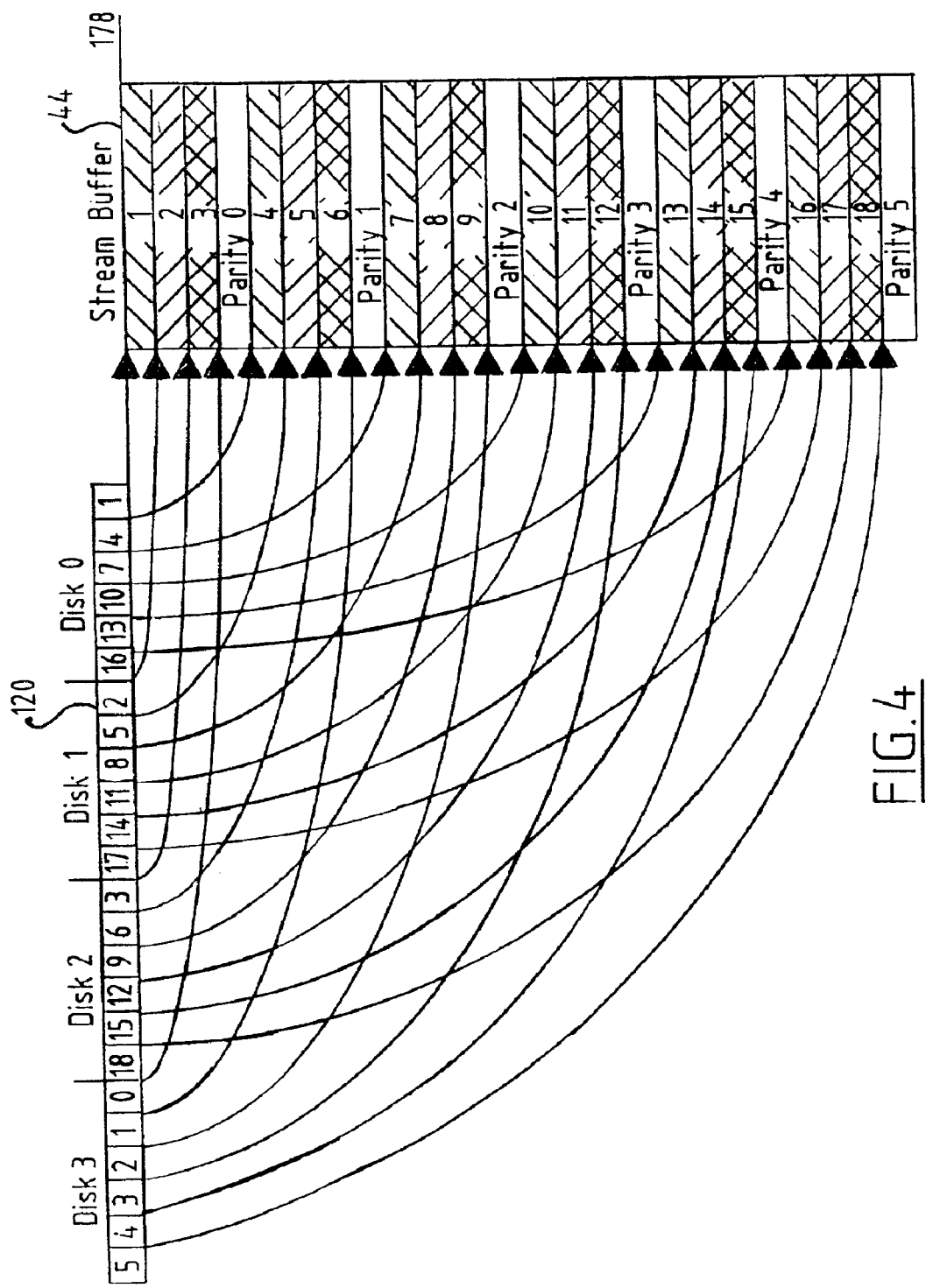
FIG. 4 shows an example of the use of the address translator of FIG. 3.
Figure 6:
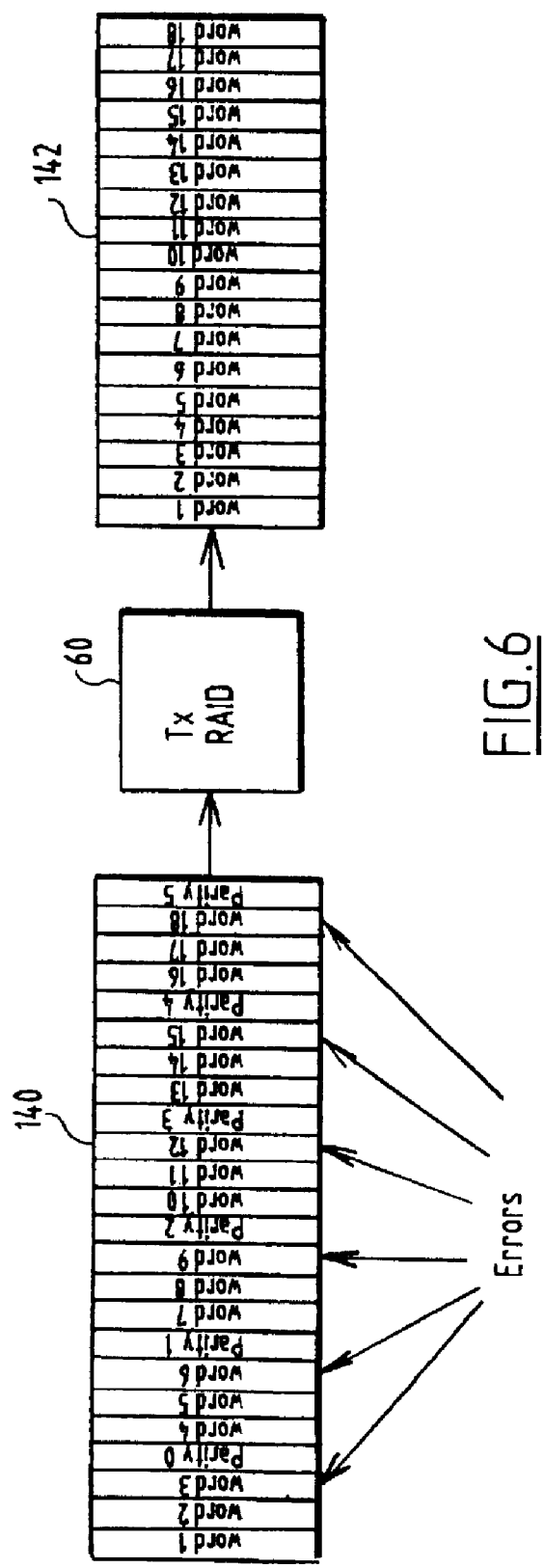
FIG. 6 shows an example of use of the Tx rate block of FIG. 2.

For example, in case of FIG. 4, the words 3, 6, 9, 12, 15, 18 from the failure Disk 2 in the input data 142 include error shown as FIG. 6. The Tx RAID block 60 reconstruct the word 3 using the words 1, 2 and the parity word 0. The Tx RAID block 60 reconstruct the word 6 using the words 4, 5 and the parity word 1. Similarly, the words 9, 12, 15, 18 are reconstructed by the Tx RAID block 60. Thus the Tx RAID block 60 performs error correction and outputs the sequence 142 of the words 1, 2, 3, 4 . . . without errors.

The RAID function can be turned on/off by the command block 66.

Traffic Shaper

The traffic shaper 62 consists of two main sections one section handles high priority data such as video traffic, and a low priority section handles general data traffic.

The high priority section is organized into several traffic classes, in which a class is a group of one or more streams having the same bit rate characteristic. For example, all streams of a CBR (Constant Bit Rate) at 2 Mbps belong to the same class. A class of VBR (Variable Bit Rate) type typically contains only one stream, because it is unlikely that two VBR streams have identical bandwidth patterns at all times. Each class has a single set of transmission parameters for controlling the bit rate, providing for low CDV (Cell Delay Variation) and accurate rate pacing. The number of classes is programmable but limited to maximum 128.

Each class has two main transmission parameters, an ideal scheduled time (TS) and an increment ($\Delta$) for the TS. The basic mechanism is that when TS becomes equal to or less than a reference clock, a stream pointer is put into the transmit queue. At the same time the value TS is incremented with the value $\Delta$. The transmit queue is a first in first out queue that will submit the stream indicated by the stream pointer the ATM fifo 72 as soon as possible.

In the high priority section a high accuracy bit rate and low CDV are achieved following mechanisms.

Figure 7:
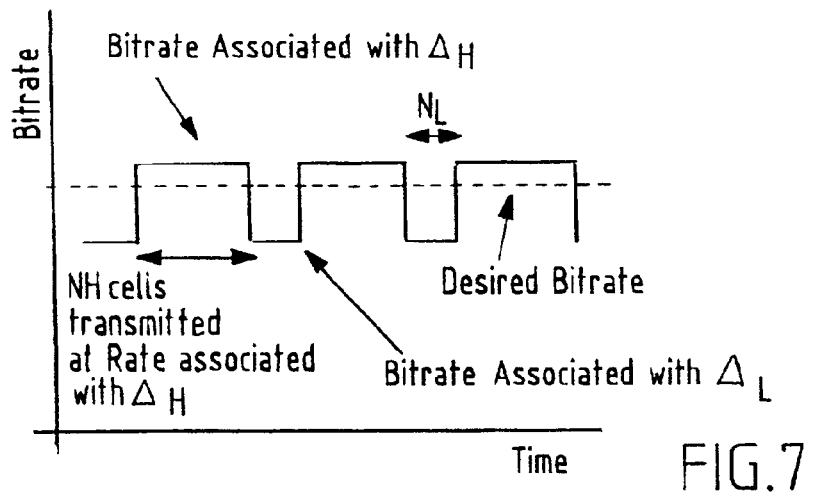
FIG. 7 shows the behaviour of a bit rate achieved by the traffic shaper of FIG. 2.

Due to the finite resolution of the reference clock, having a single $\Delta$ value usually does not give the desired accuracy. To achieve the desired accuracy, two $\Delta$ values are used alternatively that are just one counter value apart. These two values result in a rate that is slightly above and below the required bit rate. Using each $\Delta$ value for different numbers of cells compensates for the limited clock resolution and can provide arbitrary accuracy. $\Delta_H$ and $\Delta_L$ (where $\Delta_L=\Delta_H+1$) represent the two different increment values. The $N_H$ and $N_L$ parameters represent the number of cells for which the corresponding increment value are alternatively valid. By means of this mechanism, the stream is modulated whereby the average bit rate approaches the required bit rate within the desired accuracy. FIG. 7 shows a behavior of a bit rate achieved by this mechanism. In FIG. 7, $N_H$ cells are sent at $\Delta_H$ and $N_L$ cells are sent at $\Delta_L$. This sequence is repeated cyclically. Thus the average bit rate shown by a dotted line is maintained as a long term bit rate.

Figure 8:
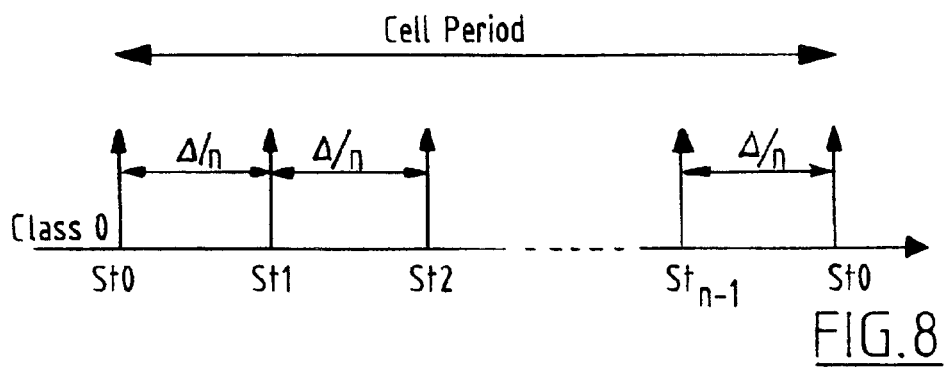
FIG. 8 shows a diagram for explaning the sending of stream within one cell period.

Low CDV is achieved by reducing the collisions in scheduling times of cells from different streams. A major cause of collisions in many existing traffic shaping mechanisms is that streams of the same bit rate are scheduled at the same time. This is particularly a problem when there is a large number of streams and a low number of independent bit rates. This problem is addressed in the preferred embodiment by evenly spacing the cells of streams belonging to the same class. In other words, if the increment for one stream should be $\Delta$, the increment for the class is $\Delta/n$, where n is the number of streams in a class. Every time a class is to be serviced, the data is taken from successive streams. For example, If cells of the stream 0 belonging to Class 0 should be incremented by $\Delta$, each cell of the streams (i.e. stream 0–stream n–1) belonging to the same class 0 is sent with the space of $\Delta/n$ shown as FIG. 8.

Figure 9:
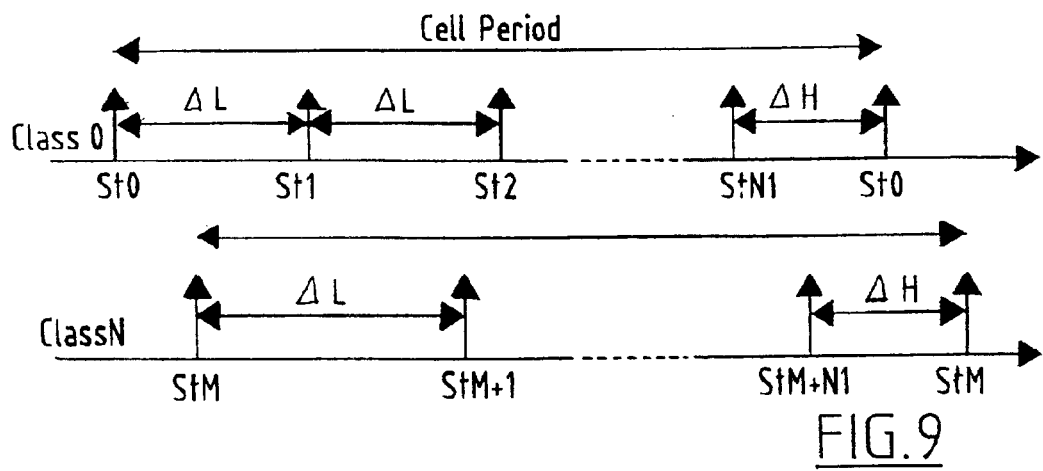
FIG. 9 shows the submission of cells for different classes.

By the combination of the above two mechanisms, a high accuracy bit rate and low CDV are achieved. If the transmit queue does not get blocked, the cells are submitted shown as FIG. 9.

The high priority section also handles VBR traffic. The traffic shaper 62 supports smooth update of the transmission parameters. This update can be done by the host 28 but also by the command block 66. The command block 66 is programmed by the host 28, and its actions are triggered when an exact location is transmitted from the stream buffer 44. One such action is to replace the transmission parameters for a specified stream in the traffic shaper 62. As soon as the data just before a change in bit rate are sent, the command block 66 updates the parameters. Once it is set-up, this process is autonomous and does not require interaction of the host CPU 30 anymore. As a consequence, the host 28 does not need to interact exactly at the moment interaction would be required. In this way the real-time character of the stream is maintained and the host load kept to a minimum.

The low priority section is organized into e.g. fixed 32 traffic classes, in which a class is a group of one or more streams having the same PCR (Peak Cell Rate). In terms of the general data traffic, the real-time constraints are much less significant. The main objective of the traffic shaping of the low priority section is to limit the PCR in order to avoid network policing. The traffic shaping of the data packets is implemented by a mechanism using an ideal scheduled time (TS) and an increment (A) for the TS, which is similar to the basic traffic shaping mechanism in the high priority section. However, scheduling of data packets gets a lower priority than real time traffic. Only if the transmit queue of the high priority section is empty, a stream of the data packets can be submitted to the ATM FIFO 72.

Figure 10:
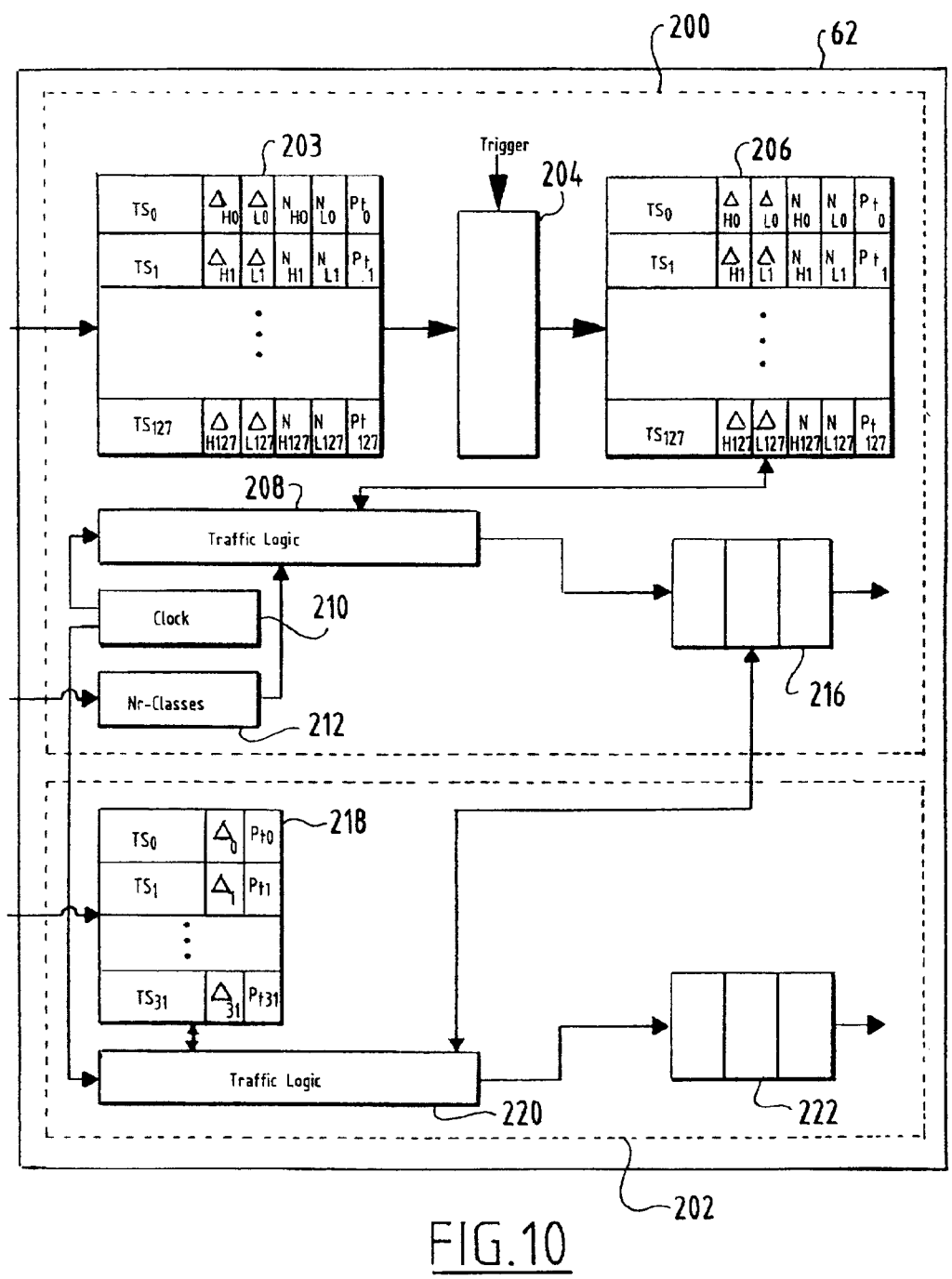
FIG. 10 is a block diagram of an architecture for the traffic shaper of FIG. 2.

The mechanism is implemented with an architecture shown as FIG. 10. The traffic shaper 62 consists of the high priority section 200 and the low priority section 202 as mentioned above.

In the high priority section 200, a memory 203 stores a set of new transmission parameters for each class provided from the host 28. Each set of the new transmission parameters consists of $TS_i$, $\Delta_H i$, $\Delta_L i$, $N_H i$, $N_L i$ and $Pt_i$ (where $0 \leq i \leq 127$). In this embodiment $Pt_i$ contains one or more stream pointers which indicate one or more streams attached to the class i. A memory 206 stores current transmission parameters. When a command is instructed by the host 28 or the command block 66, an update logic 204 is triggered by the command, whereby the current transmission parameters in the memory 206 are updated with the new transmission parameters in the memory 203. A register 212 stores a parameter Nr_Classes indicating the number of class from the host 28 at receipt thereof. A traffic logic 208 checks for each of classes from 0 to Nr_Classes-1 whether $TS_i$ is equal to or less than the current time indicated by a reference clock 210. If so, the stream pointer of the first stream attached to this class i is inserted to a high priority transmit queue 216 and $TS_i$ in the memory 206 is incremented with $\Delta_H i$ or $\Delta_L i$ of this class i by the traffic logic 208. The $\Delta_H i$ and $\Delta_L i$ are alternated according to the $N_H i$ and $N_L i$. Then the segmentation block 70 receives the stream pointer from the high priority transmit queue 216 and puts a ATM cell belonging to the stream indicated by the stream pointer into ATM FIFO 72.

In the low priority section 202, a memory 218 stores a set of transmission parameters for each class provided from the host 28. In this embodiment each set of the transmission parameters consists of $TS_j$, $\Delta_j$ and $Pt_j$ (where $0 \leq j \leq 31$). Pt, contains one or more stream pointers which indicate one or more streams attached to the class j. A traffic logic 220 checks each of classes from 0 to 31 if $TS_j$ is equal to or less than the current time indicated by the reference clock 210 and monitors where the high priority transmit queue 216 is empty. If so, the stream pointer of the first stream attached to this class j is inserted to a low priority transmit queue 222 and $TS_j$ in the memory 218 is incremented with $\Delta_j$ of this class j by the traffic logic 220. Then the segmentation block 70 receives the stream pointer from the low priority transmit queue 222 and puts a ATM cell belonging to the stream indicated by the stream pointer into ATM FIFO 72.

In the above embodiment, a traffic shaping mechanism being similar to the mechanism of high priority section 200 is applied to the low priority section 202. However conventional leaky bucket mechanism may be applied to the traffic shaping mechanism of the low priority section 202.

Command Block

Real time data delivery may sometimes involve actions occurring at specific locations in the outgoing data stream. These actions must be immediate in order to maintain the integrity of the stream. Due to the many responsibilities of the host 28, timely interaction cannot always guaranteed. In the preferred embodiment, it is the responsibility of the command block 66 to perform these interactions. In principle, the host 28 knows exactly where in the outgoing data stream the streaming parameters need to be adjusted. Since each stream buffer 44 is allocated statically as mentioned above, it is possible to express a location, where the actions should be taken, in read pointer of the stream buffer 44. The host 28 loads a list of the command block 66 with a number of instructions at the appropriate moment in time. The appropriate time is the time between the loading of the outgoing data stream to the stream buffer 44 and the time that the outgoing data stream is sent out from the stream buffer 44. The command block 66 scans the read pointer of the stream buffer 44. If a match with a specified address is found, a command that is linked to that address will be executed and the command will be purged from the command block 66.

Figure 11:
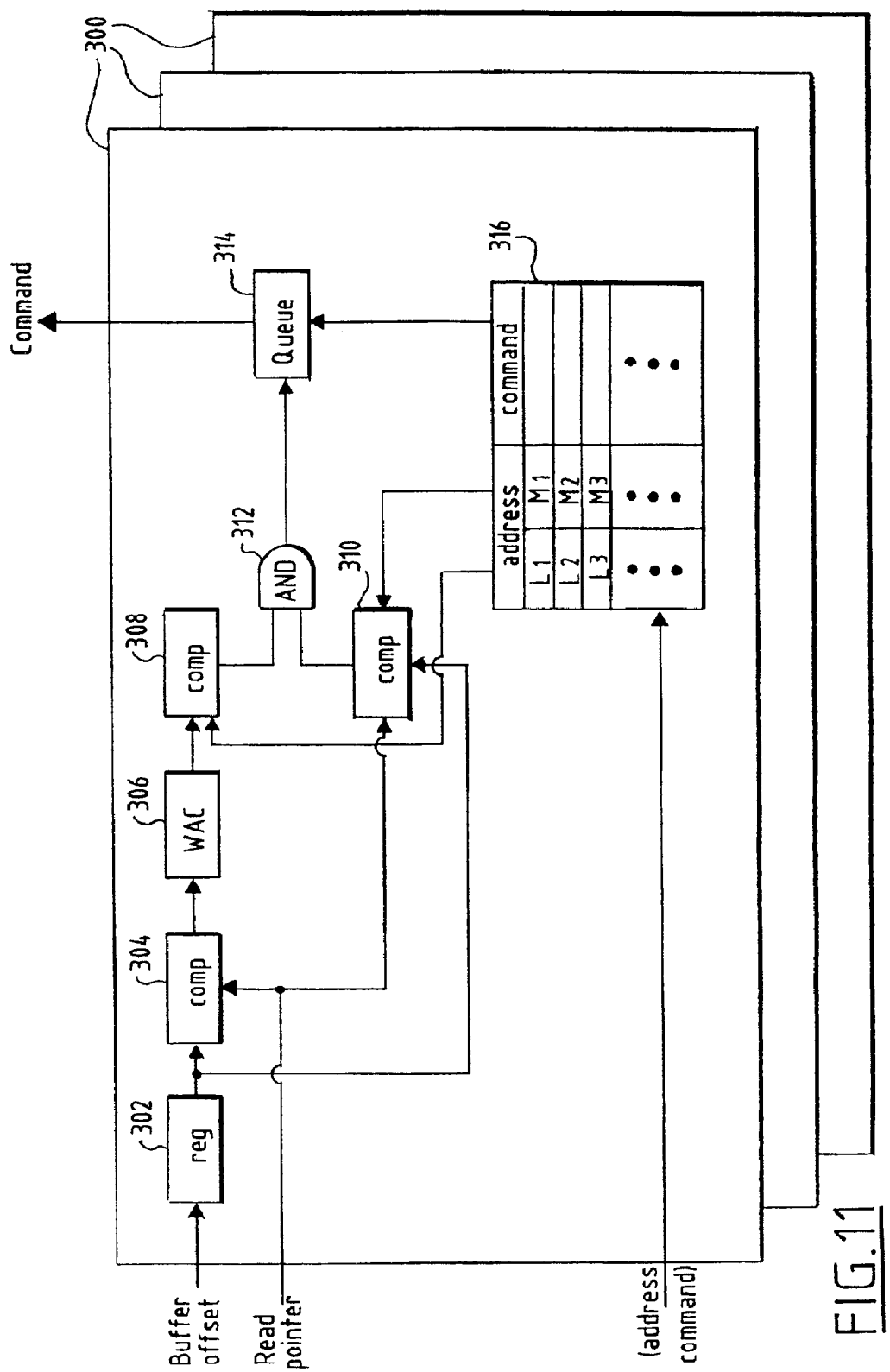
FIG. 11 shows a block diagram of the command block of FIG. 2.

The command block 66 triggers on the address of the data leaving the stream buffer 44. When reading a stream buffer 44, the read pointer is gradually incremented with a wrap-around. Each stream has a linked list that contain the (address, command) pairs to be stored according to the address. An address is a pair (L, M) indicating the address in the file and is independent from the physical address. L is the number of blocks, with a block size equal to the size of the stream buffer 44. M is sequence number in the last block. Each stream maintains a WAC (Wrap-around counter) that counts the number of times the read pointer has been wrapped around. An address match is found if L=WAC and M=Read Pointer−Buffer Offset This mechanism is implemented as follows. FIG. 11 shows a block diagram of the command block 66. The command block 66 consists of several command generators 300. Each command generator 300 handles the commands for each outgoing data stream. The host 28 loads a list of commands in the command register 316 in each command generator 300 at the appropriate moment in time.

In a command generator 300, a register 302 stores the Buffer offset. A comparator 304 compares the Buffer Offset in the register 302 with the read pointer of the stream buffer 44. When a wrap-around occurs, the read pointer takes the Buffer Offset. Therefore when the match is detected by the comparator 304, the WAC (Wrap-Around Counter) 306 is incremented. The comparator 308 compares the count of the WAC 306 with current L provided from the command register 316. A comparator 310 compares current M provided from the command register 316 with the read pointer—Buffer Offset. When the matches are detected by the comparator 308 and the comparator 310, the AND gate 312 dequeues a current command stored by a queue 314. Each time a current command corresponding to a current address (L, M) is output from the queue 314, a command corresponding to a next address is queued in the queue 314 from the command register 316. Thus each command generator 300 instructs commands according to a read pointer of the stream buffer 44.

The commands to be instructed from the command block 66 are:

Change bit rate: This command will allow to change a stream bandwidth. When this command is instructed, the traffic shaper 62 detach a stream from its current class, updates the $\Delta$ values for the current class, attach the stream to a new class and update the linked $\Delta$ values of the new class. Thus the bit rate of individual steams is changed at specific stream locations. This is useful for MPEG bit stream of VBR (variable bit rate), for example.

Insert RCI: This command allows to insert an RCI (Rate Change Indicator) at specific location in the stream. The RCI is able to notify the distant terminal (e.g., STB 18) the rate changes at that moment and aids clock recovery for MPEG decoders. The detail of the RCI is described as "data rate data" in the European Patent Application EP 0 712 250 A2. When this command is instructed, the RCI generator 68 generates the RCI and the segmentation block 70 terminates the current segmentation and a separate AAL-5 PDU (one ATM cell) for the RCI is generated. This is useful for MPEG bit stream of VBR.

Enable RAID: This command set the appropriate parameters in the Tx RAID block 60 for the error correction.

Disable RAID: This function is the inverse of the above Enable RAID.

Figure 12:
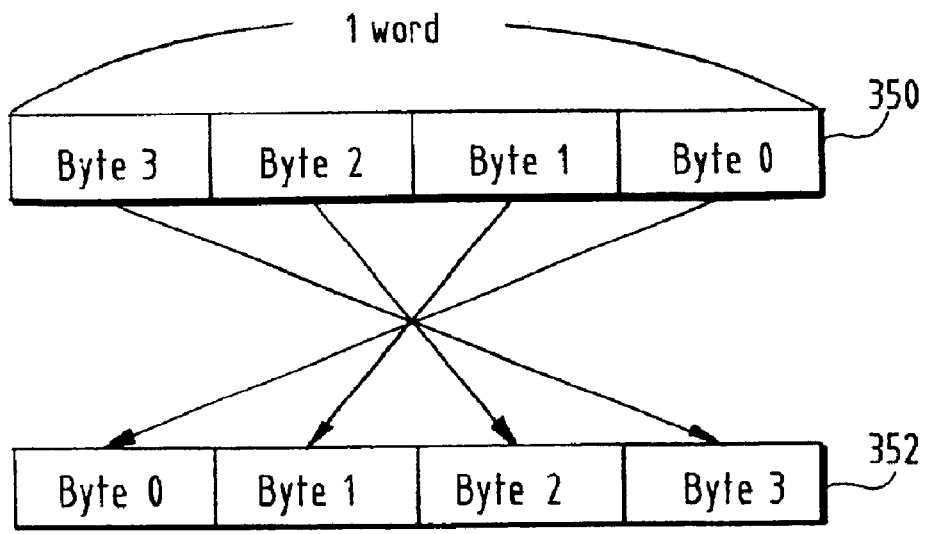
FIG. 12 is a diagram for explaning the operation of the byte swapper of FIG. 2.

Perform Byte Swap: This command allows to cope with little endian/big endian problems between the server 10 and the STB 18. When this command is instructed, the byte swapper 64 reorders the bytes within a word 350 in the outgoing stream in an order of a word 352 shown as FIG. 12.

Enable different PDU-Size: TCP can require segmentation. One TCP packet is to be divided in different IP-packets. The last IP packet requires usually a different AAL-5 PDU size than the previous one. When this command is instructed, the segmentation block 70 change the AAL-5 PDU size.

Interrupt CPU: This is the most general function. It requests the host CPU 30 interaction upon detection of a certain location in the stream.

VPI/VCI Filtering Block

Figure 13:
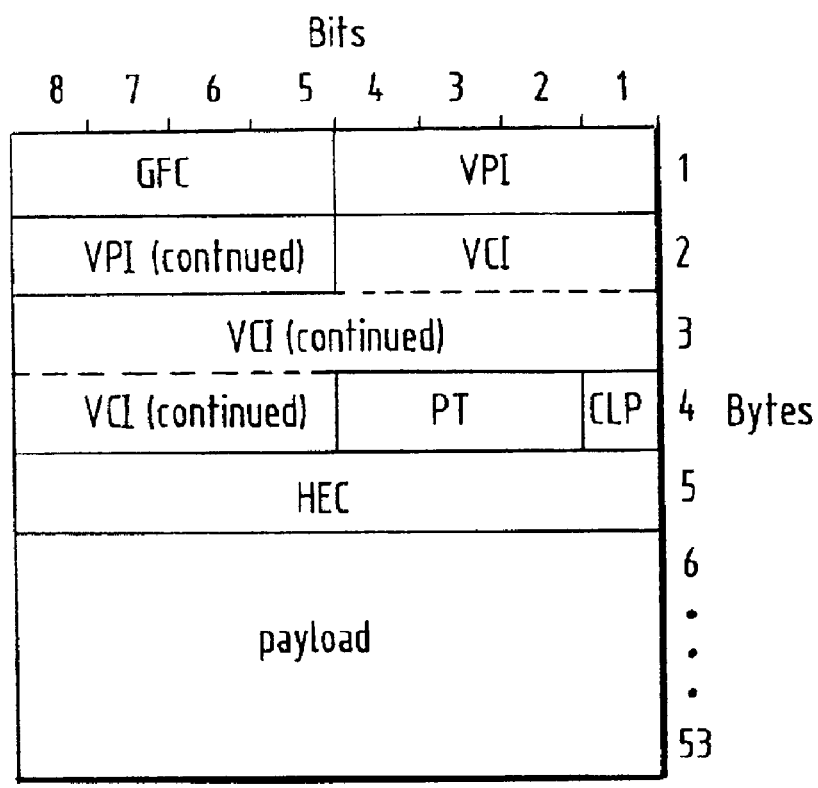
FIG. 13 shows a format of one ATM cell used in UNI.

FIG. 13 shows a format of one ATM cell used in UNI (User Network Interface). One ATM cell consists of 53 bytes. First 5 bytes constitute a ATM header and the remaining 48 bytes carry payload. The first 4 bits in the ATM header is called GFC (Generic Flow Control). The following 24 bits in the ATM header is called VPI/VCI. Actually, the VPI/VCI consists of VPI of 8 bits and VCI of 16 bits. The following 3 bits in the ATM header is called PT (Payload Type). The following 1 bit in the ATM header is called CLP (Cell Loss Priority). The last 8 bits in the ATM header is called HEC (Header Error Control). The VPI/VCI filtering block 84 receives such ATM cells from ATM FIFO 82.

The VPI/VCI filtering block 84 determines whether a VPI/VCI of the received ATM cell is an element of the set of VPI/VCIs that should be accepted, determines to which stream the ATM cell belongs, and filters OAM (operation, Administration and Maintenance) F5 cells. To achieve this filtering process, a VPI/VCI translation from a VPI/VCI to an internal stream ID is performed in a VPI/VCI translator 85 in the VPI/VCI filtering block 84.

The object of the VPI/VCI translation mechanism is to allow as wide a range of legal VPI/VCIs as possible, while at the same time facilitating fast translation. Preferably, all VPI/VCIs should be admissable. The VPI/VCI translation can be done using conventional binary search techniques. However, due to time constraints, the largest acceptable search is of the order of a binary search of 512 entries. On the other hand, the maximum number of active VPI/VCIs should be greater than 512 to support simultaneous communications with a large number of clients.

In order to meet the object, the VPI/VCI table is divided up into sections of 512 entries. Each entry indicates a relation between a VPI/VCI and an internal stream ID is entered into a certain section depending on a distribution mechanism and within each section the entries are ordered.

Upon reception of a ATM cell, once the correct section has been found, a binary search can be performed over that section to find the correct entry. Therefore the distribution mechanism to distribute the VPI/VCIs must allow immediate indexing into a section according to the VPI/VCI. Moreover, to allow for efficient use of the VPI/VCI table, the mechanism must allow for a wide distribution of the VPI/VCIs. In other words, the mechanism must distribute the entries as randomly as possible over the entire VPI/VCI table. If a VPI/VCI maps into a section of the VPI/VCI table that is already full, it must be rejected even though there may be space in other sections.

One distribution mechanism that fits to the requirements is to simply use the lower X (where X is integer; e.g., 3) bits of the VCI as hash key to index into the VPI/VCI table. It is reasonable that when there are a large number of active VP/VCs the lower bits will be the most random of the 24 bits VPI/VCI field and allow for an even distribution.

Using this type of mechanism, the requirements of fast look up and no illegal or inadmissable VPI/VCIs are met. The mechanism is implemented as follows.

Figure 14:
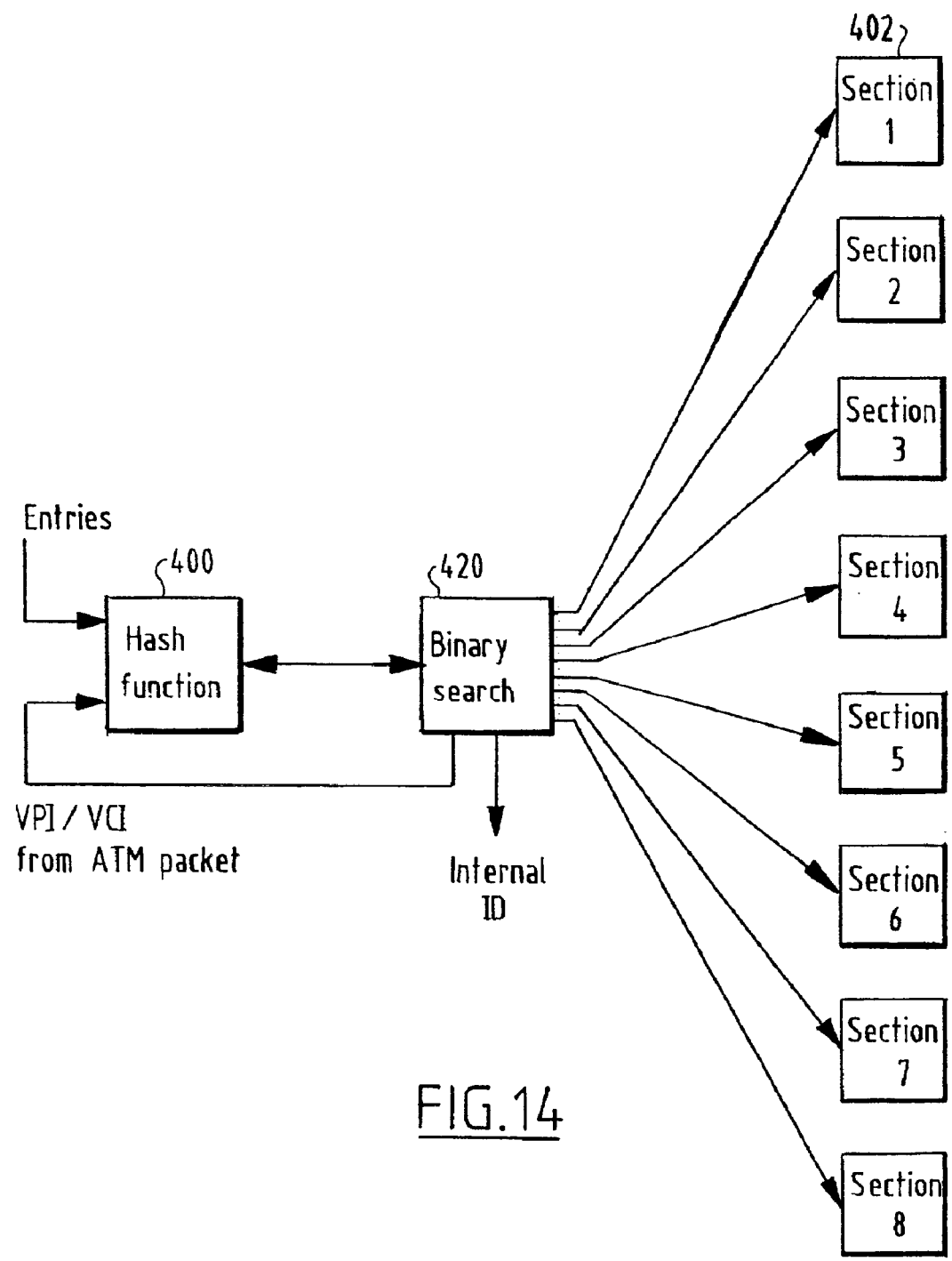
FIG. 14 shows a block diagram of the VPI/VCI translator of FIG. 2.

FIG. 14 shows a block diagram of the VPI/VCI translator 85. When a new VP/VC become active, a new entry indicating a VPI/VCI of that new VP/VC and an internal stream ID corresponding to that VPI/VCI is entered into a section according to the lower 3 bits of the VCI (i.e., bits 7, 6, 5 of 4-th byte in FIG. 13) via a hash function 400. More specifically, if the lower 3 bits of the VCI is 0.000, the entry is stored in the section 1 in the VPI/VCI table 402. If the lower 3 bits of the VCI is 001, the entry is stored in the section 2 in the VPI/VCI table 402. If the lower 3 bits of the VCI is 010, the entry is stored in the section 3 in the VPI/VCI table 402. Similarly, all new entries are stored in appropriate sections according to the lower 3 bits of the VCI. Thus, the VPI/VCI table 402 of e.g. 4096 entries is divided up into 8 sections (section 1–8) of e.g. 512 entries. Within each section the entries are reordered in an ascending or descending order to implement a binary search.

Upon reception of an ATM cell, the VPI/VCI of the received ATM cell is provided to a search engine 420 and the hash function 400. The hash function 400 provides a section index based on the lower 3 bits of the VPI/VCI to the search engine 420. Then a binary search is performed by the search engine 420 over a section corresponding to the section index to find the correct entry. For example, if the lower 3 bits of the VCI of the received ATM cell is 010, the hash function 400 provides 3 as the section index to the search engine 420.

Then, the search engine 420 performs a binary search over the section 3 to find a correct entry and outputs a internal stream ID of the found entry. If the lower 3 bits of the VCI of the received ATM cell is 111, the hash function 400 provides 8 as the section index to the search engine 420. Then, the search engine 420 performs a binary search over the section 8 to find a correct entry and outputs a internal stream ID of the found entry. The output internal stream ID is used for the filtering process.

In the above embodiment, the lower 3 bits of the VPI/VCI field is simply used as a section index. However, a more complex hash function may be used over the VPI/VCI field to generate a section index.

In the above embodiment, when a new VP/VC becomes active, the new entry is entered to an appropriate section via the hash function 400. However, it is possible to create a new VPI/VCI table including the new entry in the host 28 having a hash function of the same mechanism as the hash function 400, transfer the new VPI/VCI table to the VPI/VCI translator 85 and update the VPI/VCI table 402 with the new VPI/VCI table.

Pattern Detector

The host 28 knows what kind of data incoming in over a specific VC. The host 28 instruct the patten detector 92, per VC, which pattern is to be scanned for. The purpose of the pattern detector 92 is to detect a preset bit pattern in the incoming data stream. Each time a match is detected, the pattern detector 92 informs the host 28 the "data detected" state. When the host 28 receives the information of the detection, it adds the address at which it occurs to a list in the host memory 32. As the detection itself is done automatically, the host 28 can perform other jobs in the mean time. The host 28 only needs to be interrupted in case the pre-set bit pattern is detected and the action can be taken.

Figure 15:
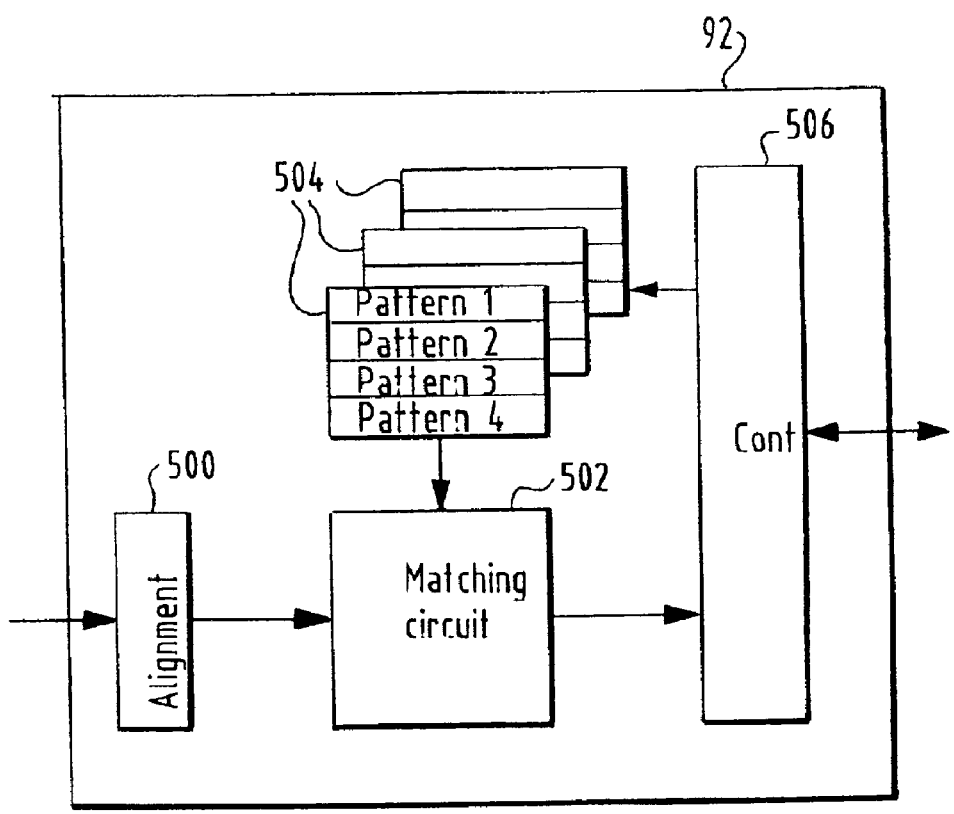
FIG. 15 shows a block diagram of the pattern detector of FIG. 2.

FIG. 15 shows a block diagram of the pattern detector 92. Before the incoming data stream is transmitted through the reception path 80, the host 28 instructs the pattern detect controller 506, per VC, which pattern is to be scanned for. The pattern detect controller 506 can set 4 pre-programmed bit pattern of 32 bits wide in register 504 for each stream. The alignment circuit 500 performs byte alignment of incoming data stream. The matching circuit 502 performs byte aligned matching against 4 pre-programmed bit patterns per stream. Each time the match is detected, the matching circuit 502 informs the controller 506 of the detection.

An example of the purpose of pattern detector 92 is to find locations of I-picture in video bit stream compressed according to the MPEG standard. In the MPEG bit stream, a picture immediately following GOP header is always I-picture. Therefore, It is possible to find a location of I-picture by detecting group_start_code (32 bits) identifying the beginning of GOP header and picture_start_code (32 bits) identifying the beginning of picture header.

For instance, when a MPEG bit stream of a movie is transferred from another SMU 12 in order to duplicate the movie, group_start_code and picture_start_code are set in the register 504 as pre-set bit patterns. The pattern detector 92 detects group_start_code and picture_start_code in the received MPEG bit stream. Each time picture_start_code is detected immediately after the detection of group_start_code in the matching circuit 502, the pattern detect controller 506 informs the detection state to the host CPU 30. The host CPU 30 adds an address of storage device 20 in which the I-picture is stored to a list in the host memory 32. Thus the list indicting locations of I-picture is constructed during the MPEG bit stream flows in the reception path 80.

The list is used for VCR-operation when the stored MPEG bit stream is transferred to the STB 18. If the STB 18 requests VCR operation (e.g., FF, FR), the host 28 refers this list and instructs the storage device controller 22 to access and retrieve the I-pictures.

Using this feature, the data stored in the storage device 20 is "raw" or not formatted for a specific application. This increases the "application independence" and interoperability of server system 10 (FIG. 1).

Rx Address Translator

The purpose of the Rx address translator 96 is to gather different (non-contiguous) words from a stream buffer 46 and to create a burst data to the PCI bus 24. It is basically the inverse function of the address translation of the Tx address translator 54. The difference is that in this case a dynamic buffer structure must be considered. The burst data is transferred to the storage device 20 or the host 28 via the PCI bus 24.

Figure 16:
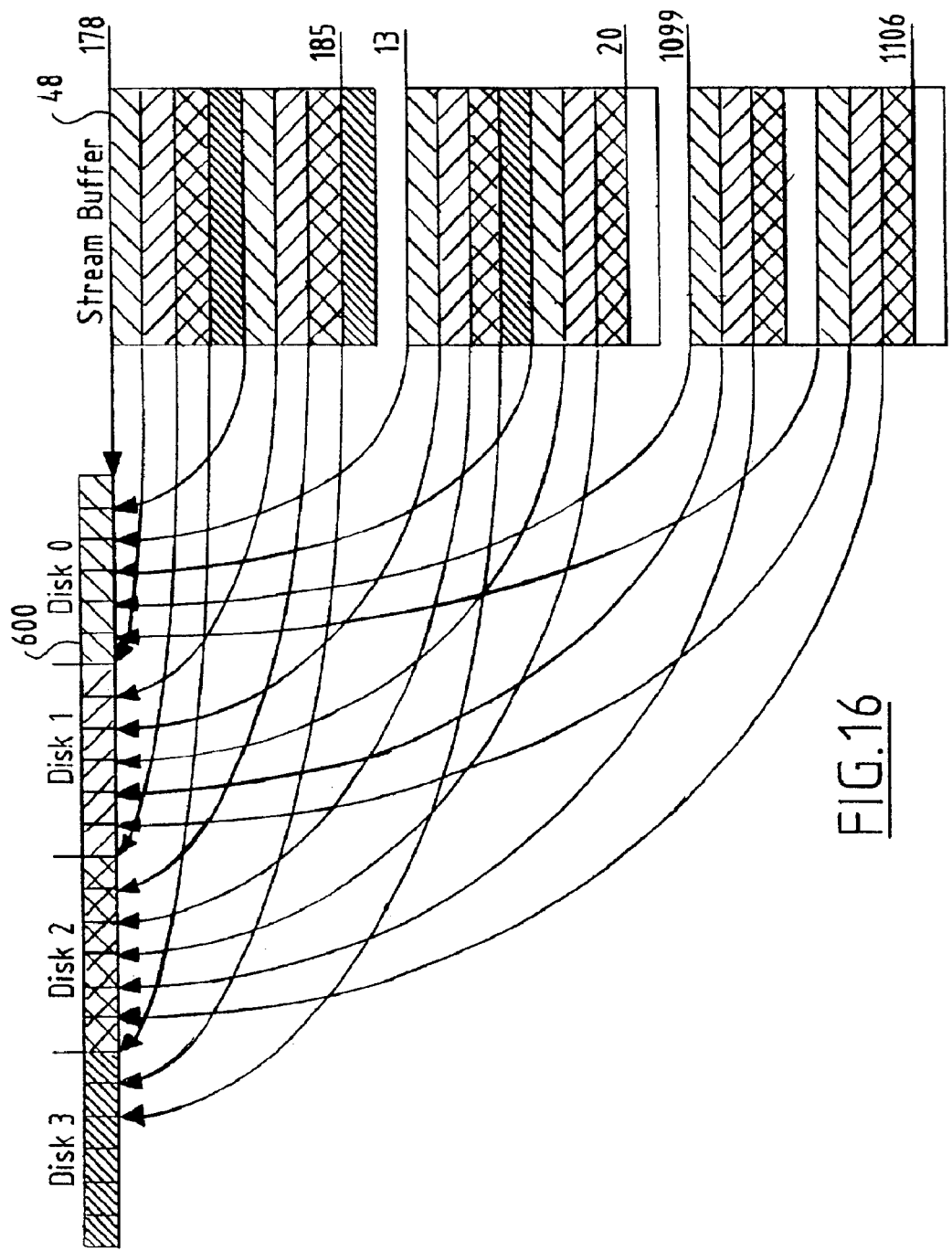
FIG. 16 shows an example of an address translator of FIG. 2.

FIG. 16 shows an example of an address translation applied to a incoming data stream to be stored in Disk 0, 1, 2 and 3 of the storage device 20. In this example, the following sequence of read addresses for the stream buffer 48 is generated by the Rx address translator 96 to create a burst data 600.

| | |
|---|---|
| 178, 182, 13, 17, 1099, 1103 | (for Disk 0) |
| 179, 183, 14, 18, 1100, 1104 | (for Disk 1) |
| 180, 184, 15, 19, 1101, 1105 | (for Disk 2) |
| 181, 185, 16 . . . | (for Disk 3) |

What is claimed is:

1. A method toy delivering data comprising the steps of:
    loading at least a pair of an address and a command from a host;
    storing the data in a buffer;
    reading the data from the buffer according to a read pointer;
    executing the command if a match between the address and an address specified by the read pointer in detected; and
    delivering the data read from the buffer, wherein the command causes inserting a Rate Change Indicator into a specific location in the data read from the buffer for notifying a distant terminal the rate changes at that moment after the execution of the command.

2. A method according to claim 1, wherein the command causes changing a stream bandwidth of the data read from the buffer.

3. A method according to claim 1, wherein the command causes an interrupt of the host.

4. A method according to claim 1, wherein the data is read from a RAID or RDI system and is provided to the buffer and the command enables and disables a RAID function for correcting an error.

5. A method according to claim 1, wherein the command causes swapping bytes of the data read from the buffer.

6. A method according to claim 1, wherein the command causes changing a PDU-size in AAL segmentation applied to the data read from the buffer.

7. A device for delivering data comprising:
    a command block for storing at least a pair of an address and a command loaded from a host and detecting a match between the address and an address specified by a read pointer of a buffer buffering the data;
    means for executing the command in cooperation with the command block when the match is detected; and
    means for delivering the data read from the buffer after the execution of the commands, wherein the command causes inserting a Rate Change Indicator into a specific location in the data read from the buffer for notifying a distant terminal the rate changes at that moment.

8. A device according to claim 7, wherein the means for executing changes of a stream bandwidth of the data read from the buffer according to the command.

9. A device according to claim 7, wherein the command causes an interrupt of the host.

10. A device according to claim 7, wherein the data is read from a RAID or RDI system and is provided to the buffer, and the means for executing changes whether performing an error correction or not according to the command.

11. A device according to claim 7, wherein the means for executing swaps bytes of the data read from the buffer according to the command.

12. A device according to claim 7, wherein the means for executing applies AAL segmentation with PDUs to the data read from the buffer and changes the PDU-size according to the command.

* * * * *